United States Patent
Kirikera et al.

(10) Patent No.: US 8,899,105 B2
(45) Date of Patent: Dec. 2, 2014

(54) SLIM CAPACITANCE SENSOR FOR DOWNHOLE APPLICATIONS

(76) Inventors: Goutham R. Kirikera, Tulsa, OK (US); William M. Patton, Tulsa, OK (US)

(*) Notice: Subject to any disclaimer, the term of this patent is extended or adjusted under 35 U.S.C. 154(b) by 266 days.

(21) Appl. No.: 13/597,827

(22) Filed: Aug. 29, 2012

(65) Prior Publication Data

US 2014/0060173 A1 Mar. 6, 2014

(51) Int. Cl.
G01L 9/12 (2006.01)
E21B 47/06 (2012.01)
G01L 9/00 (2006.01)
E21B 21/08 (2006.01)

(52) U.S. Cl.
CPC .............. *E21B 47/06* (2013.01); *G01L 9/0072* (2013.01); *E21B 21/08* (2013.01); *G01L 9/0044* (2013.01)
USPC .......... 73/152.21; 73/152.51; 73/718; 73/724

(58) Field of Classification Search
None
See application file for complete search history.

(56) References Cited

U.S. PATENT DOCUMENTS

| | | | |
|---|---|---|---|
| 2,944,199 A | 7/1960 | Hudson | |
| 3,703,828 A * | 11/1972 | Bullard et al. | .............. 73/179 |
| 4,064,549 A | 12/1977 | Cretzler | |
| 4,125,027 A | 11/1978 | Clark | |
| 4,434,451 A | 2/1984 | Delatorre | |
| 4,523,474 A | 6/1985 | Browne et al. | |
| 4,555,952 A * | 12/1985 | Jenkins | ........... 73/861.47 |
| 4,772,983 A | 9/1988 | Kerber | |
| 4,997,521 A | 3/1991 | Howe et al. | |
| 5,151,660 A | 9/1992 | Powers et al. | |
| 5,353,643 A | 10/1994 | Glaser | |
| 5,363,703 A | 11/1994 | Delatorre | |
| 5,808,205 A | 9/1998 | Romo | |
| 7,757,552 B2 | 7/2010 | Bogath et al. | |
| 8,141,429 B2 | 3/2012 | Guo | |
| 2008/0184787 A1 | 8/2008 | Coates | |
| 2009/0114029 A1* | 5/2009 | Ide | ................. 73/724 |
| 2009/0255343 A1* | 10/2009 | Uehara et al. | .............. 73/724 |
| 2011/0290031 A1* | 12/2011 | Kuwahara et al. | ............ 73/724 |
| 2012/0265455 A1* | 10/2012 | Tham et al. | ............... 702/50 |
| 2013/0109990 A1* | 5/2013 | Akingba et al. | ........... 600/529 |

FOREIGN PATENT DOCUMENTS

| | | |
|---|---|---|
| DE | 4230031 | 3/1993 |
| DE | 102008042648 | 4/2010 |
| EP | 0160713 | 11/1985 |

* cited by examiner

*Primary Examiner* — Andre Allen
(74) *Attorney, Agent, or Firm* — GableGotwals

(57) ABSTRACT

A capacitive pressure sensor includes a stator which encircles a portion of a cylindrical diaphragm. This encircling forms a circumferential gap between the sidewalls of the stator and the diaphragm. Therefore, a greater area "A" can be achieved in smaller diameter sensor footprint than prior art designs and yet still detect relatively small changes in capacitance. Additionally, the width "$g_1$" of the gap can be wider than prior art designs without negatively affecting capacitance detection. A bonding agent which has a melting temperature of about half that of bonding agents used in prior art designs, secures the stator to the diaphragm and reduces oxidation issues during assembly, thereby decreasing manufacturing time and cost. To ensure proper side-to-side alignment of the stator relative to the diaphragm, a centering sleeve, which is removed after bonding, is placed over as stub at the upper end of the diaphragm.

20 Claims, 5 Drawing Sheets

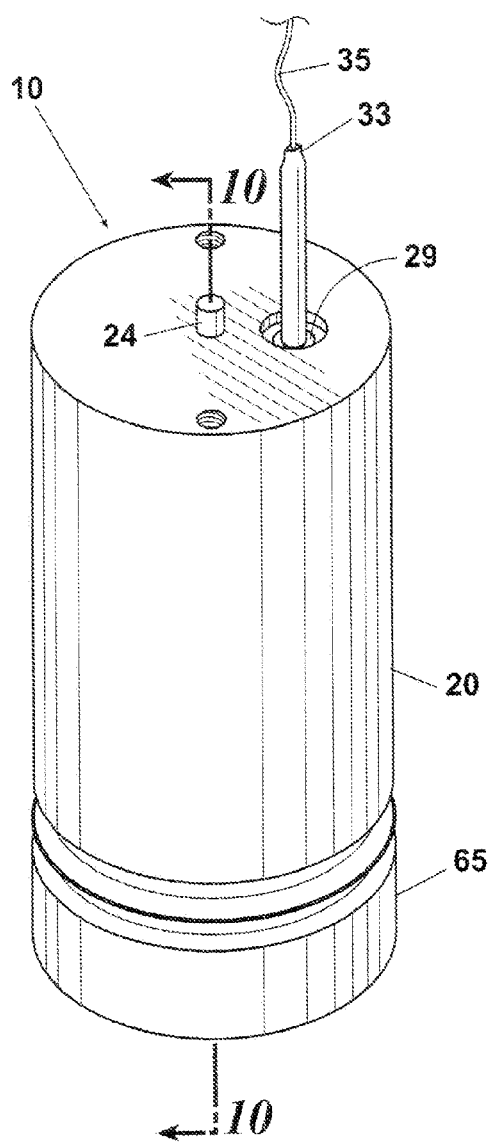
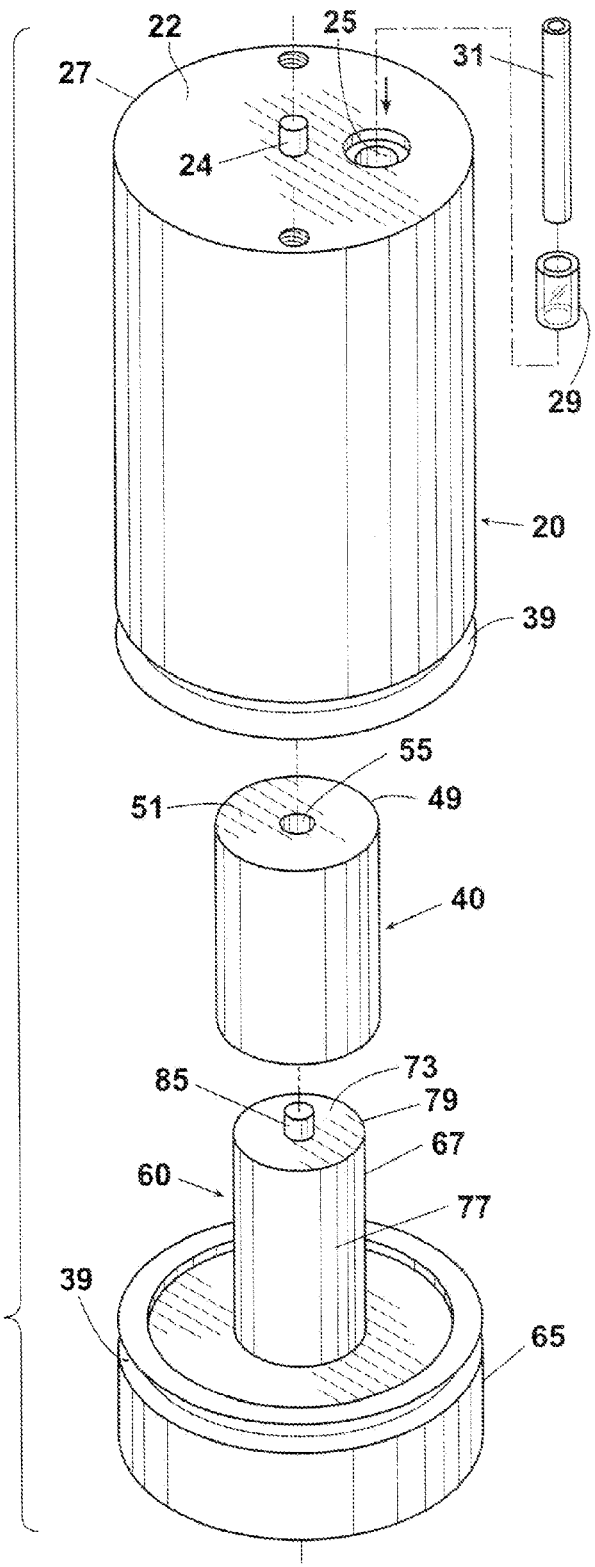
Fig. 1
Fig. 2

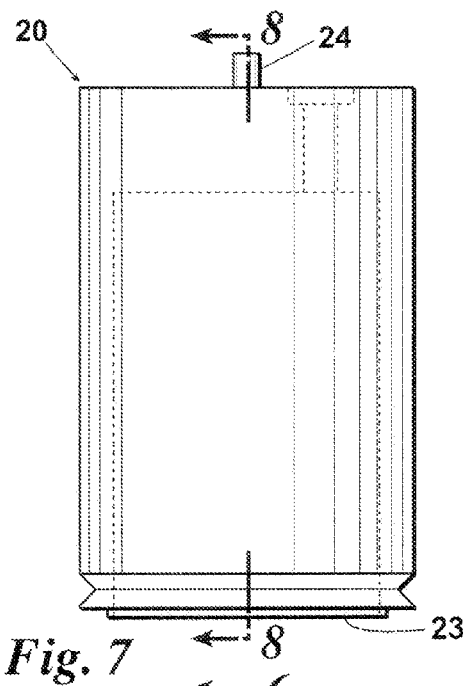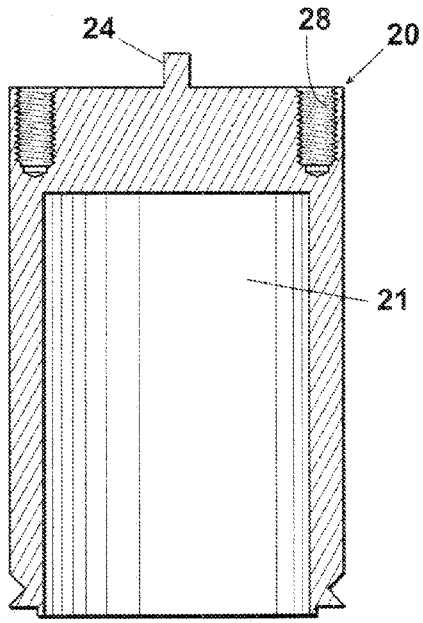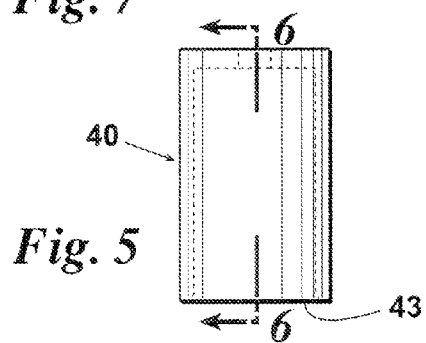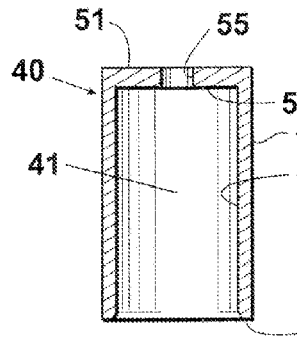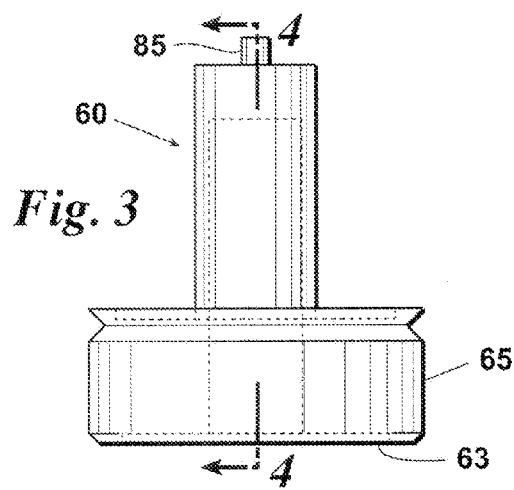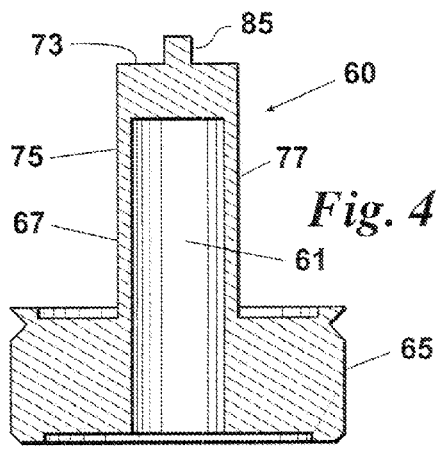

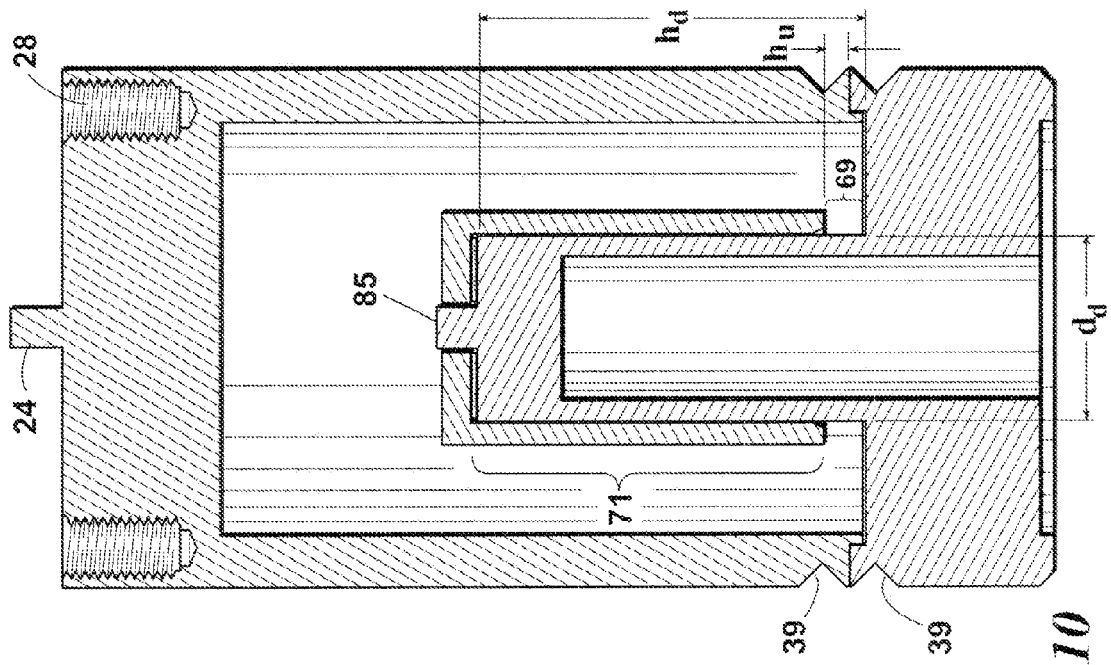
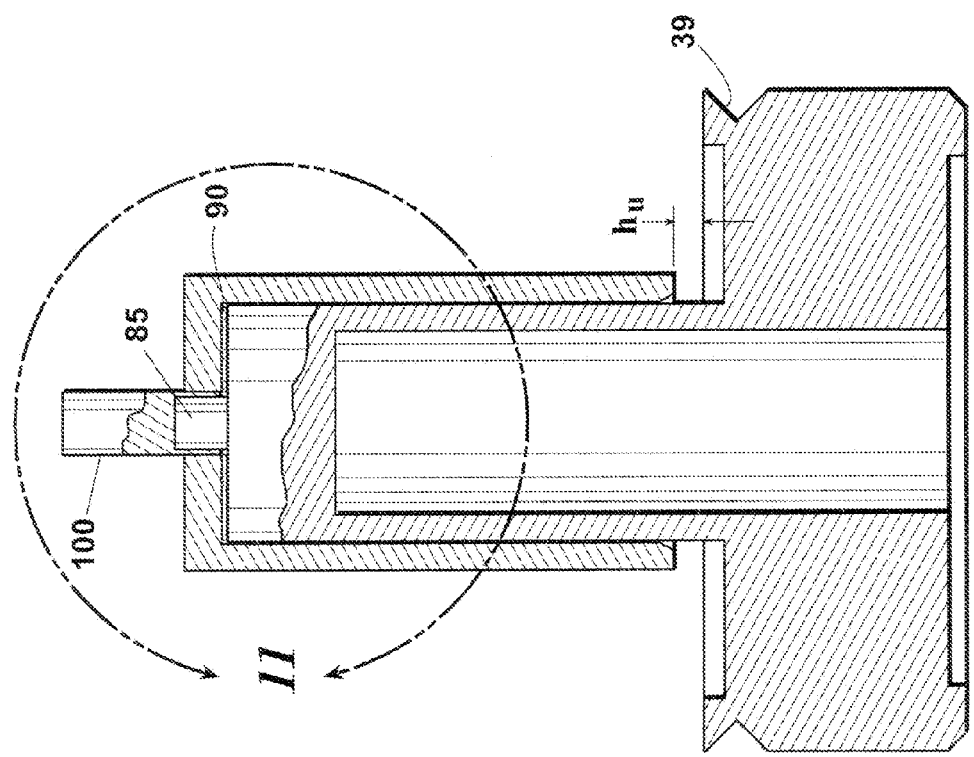
*Fig. 9*
*Fig. 10*

SLIM CAPACITANCE SENSOR FOR DOWNHOLE APPLICATIONS

BACKGROUND OR THE INVENTION

This invention relates generally to gauges and sensors used to identify downhole pressure and temperature parameters in an oil and gas well. Specifically, the invention relates to downhole sensors which provide a variable capacitance effect in response to changes in pressure of a subterranean formation.

Downhole capacitance sensors are well-known in the art and make use of the following relationship:

$$C = \frac{\varepsilon A}{g} \quad \text{(Eq. 1)}$$

where "C" is capacitance, "$\varepsilon$" is the dielectric constant of the medium in which the sensor is encapsulated, "A" is the area of the sensor (i.e., the area represented by the opposing wall surfaces of a diaphragm and stator of the sensor), and "g" is the distance or width of the gap between opposing wall surfaces of the stator and the diaphragm. The stator and diaphragm are arranged one above the other in a horizontal plane within a protective housing having a hollow interior and an open bottom. Essentially, the available area "A" is the top surface of the diaphragm less that of a spacer or washer placed between the stator and the diaphragm, that is, $\pi(r_1^2 - r_2^2)$, where "$r_1$" is the radius of the diaphragm and "$r_2$" is the radius of the spacer or washer. Oil or gas enters the interior and applies pressure to an underside of the diaphragm. As the diaphragm flexes, the gap "g" between it and the stator increases (because the stator is connected to the post and moves up as the post moves) and capacitance "C" decreases, thereby indicating increased pressure. Additional explanation of the way in which this type of capacitance sensor works can be found in U.S. Pat. No. 4,125,027, to Clark, which is hereby incorporated herein by reference. A typical downhole capacitance sensor arranged in the above way exhibits a capacitance of between 25 and 40 pF. Therefore, controlling variation in the gap "g" during the assembly process is important.

An emerging size requirement for the gauges which house these capacitance sensors is that the gauge have a maximum diameter of less than 1¼ inches (3.175 cm) and, preferably, less than ¾ inches (1.905 cm). However, shrinking the size of the sensor is challenging because as the size of the sensor decreases, the area "A" decreases and, therefore, so does the capacitance "C". As capacitance decreases, the electronic circuit used to convert capacitance to frequency has difficulty isolating the difference between the sensor's capacitance and the stray capacitance. One way around this problem is to increase the capacitance "C" by decreasing the size of the gap "d" between the stator and the diaphragm. However, reducing the gap increases the likelihood of arcing. It also increases the overall cost of manufacturing the sensor because the gap is typically about 0.003 to 0.0035 in. (0.00762 to 0.00889 cm). Maintaining this gap size requires extreme precision machining much less trying to achieve an even smaller gap size. Therefore, reducing the gap "g" is extremely difficult to achieve.

A final problem with existing downhole capacitance sensors, in addition to reducing size, is that the bonding agent between the stator and the diaphragm requires temperatures of about 900 to 1000° C. for bonding to occur. High temperatures such as this cause oxidation which then adds to the complexity and cost of manufacturing. Cleaning steps and equipment such as vacuum ovens are required.

SUMMARY OF THE INVENTION

A capacitive pressure sensor made according to this invention has a cylindrical-shaped protective housing, stator and diaphragm, each being cylindrical-shaped with a hollow interior space and an open bottom end. The stator encircles a portion of the diaphragm and this encircling forms a circumferential gap between an inner sidewall surface of the stator and an outer sidewall surface of the diaphragm. The protective housing, stator, and diaphragm are each made of a material which is both thermally and electrically conductive.

Because of this structural arrangement, a greater area "A" can be achieved in a smaller diameter sensor footprint than prior art designs and yet still detect relatively small changes in capacitance e.g., in a range of 25 to 40 pf) as well detect changes up to approximately 200 pF. Additionally, the width "g" of the gap may be in the range of about 0.0003 to 0.01 in. (0.00762 to 0.0254 cm) and could be wider than this depending on the amount of area "A" being required. Preferably, the housing diameter is no greater than 2 in. (5.08 cm) and, more preferably, no greater than 1.25 in. (3.175 cm). Housing diameters no greater than 0.75 in. (1.905 cm) can also be achieved. When in a final assembled state, the interior space of the protective housing contains a dielectric medium which fills the circumferential gap.

A bonding agent, which also serves as an insulator and dielectric medium, bonds a lower planar surface of the stator to an upper planar surface of the diaphragm. Preferably, the bonding agent has a melting point no greater than 1832° F. (1000° C.) and, more preferably, no greater than about 842° F. (450° C.). The melting temperature of the stator and the diaphragm places an upper limit on the melting temperature of the bonding agent.

To ensure proper alignment of the stator relative to the diaphragm so that a predetermined width of the circumferential gap can be achieved, the diaphragm has a stub located at its upper end which receives a thru-hole opening of the insulator and the stator. A centering, sleeve, is placed over the stub and aligns the bonding agent and stator side-to-side relative to the diaphragm. The inner height of the centering sleeve is shorter than the height of the stub. This height difference ensures that when the bonding agent is being cured at temperature, the bonding agent (flowing in its liquid state) does not interact with the centering sleeve. After the stator bonds with the diaphragm the centering sleeve can be removed from the final assembly and reused as required for another assembly process. The centering sleeve can be replaced with a bonding agent but this process will not be as accurate because the centering sleeve is machined to precise tolerance whereas the bonding agent is flowing in a liquid state, potentially causing the stator to shift relative to the diaphragm.

The wall thickness at an upper end of the diaphragm is greater than the wall thickness of the sidewall of the diaphragm. The upper end wall thickness and sidewall thickness are selected such that within a predetermined pressure range the side of the diaphragm flexes or bends in response to the pressure changes but the upper end remains unaffected. The sensitivity (units of Hz/psi) of the sensor can be determined by the proper choice of the sidewall thickness to the maximum pressure the sensor is subjected to. By varying the sidewall thickness, the sensor could be used to measure pressures of up to 30,000 psi. The complete assembly is backfilled with an inert gas (e.g., helium or argon or a mixture of both) which forms a dielectric medium between the sidewalls of the stator and the diaphragm.

Equation 1 is rewritten for this invention as follows $$C = \frac{\varepsilon_1 A_1}{g_1} + \frac{\varepsilon_2 A_2}{g_2} \quad \text{(Eq. 2)}$$

where "C" is the capacitance of the sensor, "$\varepsilon_1$" is the dielectric constant of the inert gas, "$A_1$" is the area of the sidewall of the stator relative to the diaphragm, $g_1$ is the gap between the inner sidewall surface of stator and the outer sidewall surface of diaphragm, "$\varepsilon_2$" is the dielectric constant of the bonding agent. "$A_2$" is the area on the lower planar surface of the stator, and "$g_2$" is the gap between the lower planar surface of the stator and the upper planar surface of the diaphragm.

Objects of this invention include but are not limited to: (1) improving the manufacturability and ease of assembly of a downhole capacitive pressure sensor; (2) decreasing the overall diameter of the sensor relative to prior art designs while maintaining or increasing the effective area "A" available to increase capacitance ("C") and also measure capacitance changes ("$\Delta C$") relative to those same designs; and (3) accommodating an increased width "g" of the gap between the stator and the diaphragm relative to prior art designs while maintaining or increasing the ability of the sensor to detect capacitance changes in a wider range than prior art designs.

BRIEF DESCRIPTION OF THE DRAWINGS

FIG. 1 is an isometric view of a capacitance sensor made according to this invention. The diameter of the protective housing is 2 inches or less and, preferably, no greater than about 1.25 in, (3.175 cm).

FIG. 2 is an exploded isometric view of the capacitance sensor of FIG. 1. A cylindrical-shaped stator is received by a cylindrical-shaped diaphragm, thereby forming a circumferential gap having a width "g" between the inner sidewalls of the stator and the outer sidewall surface of the diaphragm.

FIG. 3 is front view of the diaphragm of the capacitance sensor of FIG. 1.

FIG. 4 is a cross-section view of the diaphragm taken along section line 4-4 of FIG. 3.

FIG. 5 is a front view of the stator of the capacitance sensor of FIG. 1.

FIG. 6 is a cross-section view of the stator taken along section line 6-6 of FIG. 5.

FIG. 7 is a front view of the housing of the capacitance sensor of FIG. 1.

FIG. 8 is a cross-section view of the housing taken along section line 8-8 of FIG. 7.

FIG. 9 is a cross-section view of the stator and diaphragm of the capacitance sensor of FIG. 1.

FIG. 10 is a cross-section view of the assembled capacitance sensor of FIG. 1. The protective housing provides an interior space for a dielectric medium which fills the circumferential gap.

Figure 11:
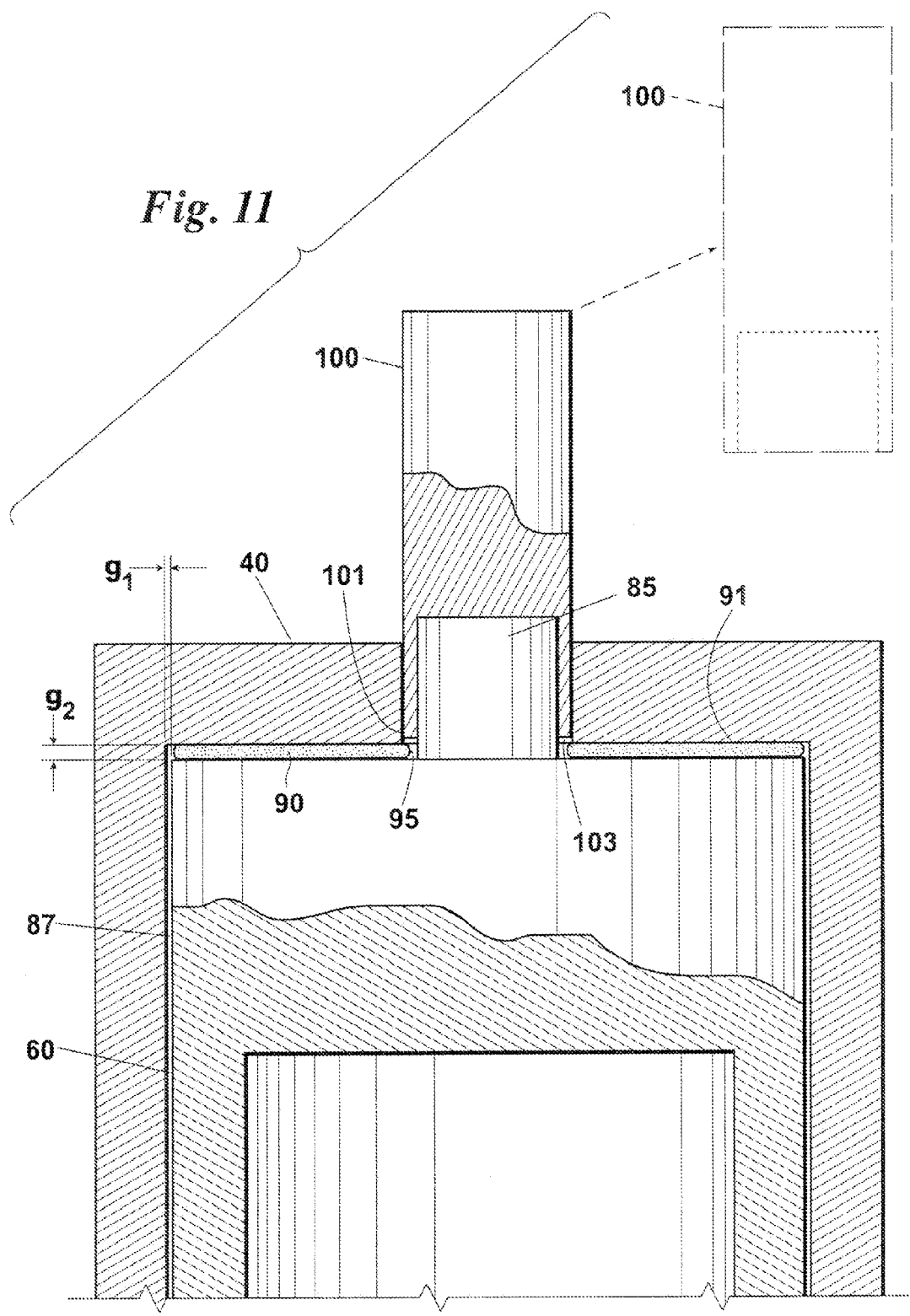
FIG. 11 is an enlarged view of the section 11 of FIG. 9. A bonding agent in the form of a spacer or washer bonds the stator to the upper end of the diaphragm but does not affect the area defined by the sidewalls.

| List of Element Numbers Used in the Drawings and Detailed Description | |
|---|---|
| 10 | Capacitance sensor |
| 20 | Protective housing |
| 21 | Interior space |
| 22 | Upper planar surface |
| 23 | Open bottom end |
| 24 | Protective housing stub |
| 25 | Thru-hole opening |
| 27 | Upper end |
| 28 | Tapped hole |
| 29 | Evacuation tube bonding agent |
| 31 | Evacuation tube |
| 33 | Upper end of 31 |
| 35 | Conductive wire |
| 37 | Lower end of 35 |
| 39 | V-groove |
| 40 | Stator |
| 41 | Interior space |
| 43 | Open bottom end |
| 45 | Sidewall |
| 47 | Inner sidewall surface |
| 49 | Upper end |
| 51 | Upper planar surface |
| 53 | Lower planar surface |
| 55 | Thru-hole opening |
| 59 | Lower end |
| 60 | Diaphragm |
| 61 | Interior space |
| 63 | Open bottom end |
| 65 | Base portion |
| 67 | Column portion |
| 69 | Un-encircled portion of 67 |
| 71 | Stator-encircled portion of 67 |
| 73 | Upper planar surface |
| 75 | Sidewall |
| 77 | Outer sidewall surface |
| 79 | Upper end |
| 85 | Stub |
| 87 | Circumferential gap |
| 90 | Bonding agent |
| 91 | Top planar surface of 90 |
| 95 | Thru-hole opening |
| 100 | Centering sleeve/fixture |
| 101 | Lower end of 100 |
| 103 | Gap between 91 and 101 |

DETAILED DESCRIPTION OF THE PREFERRED EMBODIMENTS

Referring to FIGS. 1-10, a preferred embodiment of a capacitance sensor 10 made according to this invention includes a protective housing 20, a stator 40, and a diaphragm 60. The protective housing 20, stator 40 and diaphragm 60 each have a cylindrical shape and an open bottom end 23, 43, and 63 respectively. The protective housing 20 has a hollow interior space 21 to accommodate the stator 40 and diaphragm 60 combination, the stator 40 has a hollow interior space 41 to accommodate the diaphragm 60, and the diaphragm 60 has a hollow interior space 61 to receive fluid or gas pressure from the downhole well. A base portion 65 of the diaphragm is received by the protective housing 20 and is in sealed relationship to the housing 20. This sealed relationship is achieved by welding the protective housing 20 to the base 65 of diaphragm 60. Welding is performed in the "V" grooves 39 where the weld bead flows and solidifies, thereby forming a seal.

The stator 40 and the diaphragm 60 are sized relative to each other such that when they are in an assembled and bonded state, a circumferential gap 87 is created and maintained between an inner side wall surface 47 of the stator 40 and an outer sidewall surface 77 of the diaphragm 60. The width "$g_1$" of the circumferential gap 87 can be in a range of 0.003 to 0.01 in. (0.00762 to 0.0254 cm), and preferably up to 0.005 in, (0.0127 cm) but, because of the above structural arrangement, can be wider than this range, depending on the amount of additional area "$A_1$" being provided or required (see Eqs. 1 & 2).

During the assembly process, a bonding agent 90, which is preferably a glass seal or washer, is placed over a stub 85 located at the upper end 79 of the diaphragm 60 (see FIGS. 9 & 11). The stator 40 is then placed over the diaphragm 60, with a thru-hole opening 55 located at the upper end 49 of the stator 40 being received by the stub 85. A centering sleeve or fixture 100 is then placed over the stub 85 and through a thru-hole 95 of the bonding agent 90 in order to ensure the correct width "$g_1$" of the circumferential gap 87 (see FIG. 11). As the width "$g_1$" of the gap 87 decreases the capacitance "C" increases (see Eq 2). Similarly, as the width "$g_1$" of the gap 87 increases, the capacitance "C" decreases.

The inner height of the centering sleeve 100 is shorter than the height of the stub 85. This height difference provides a gap 103 between the lower end 101 of the sleeve 100 and the top planar surface 91 of the bonding agent 90. The gap 103 helps ensure that when the bonding agent 90 is being cured at temperature, the bonding agent 90, when flowing in its liquid state, does not interact with the lower end 101 of the centering sleeve 100. After the stator 40 bonds with the diaphragm 60, the centering sleeve 100 can be removed from the final assembly and reused as required for other assembly processes. The centering sleeve 100 could be replaced with bonding agent to accomplish a similar function as that of the sleeve 100, but this process will not be as accurate because the centering sleeve 100 is machined to precise tolerance and does not change its state during the process. A bonding agent, in contrast, would be flowing in a liquid state during the process and could potentially cause the stator 40 to shift relative to the diaphragm 60.

The fixture 100 is removed after the bonding agent 90 bonds to the lower planar surface 53 of the stator 40 to the upper planar surface 73 of the diaphragm 60. Bonding agent 90 provides two additional functions in the final assembly. First, the bonding agent 90 acts as an insulator, eliminating an electrical short between the stator 40 and diaphragm 60. Second, the bonding agent 90 acts as a dielectric material, aiding in providing a capacitance to the final sensor assembly.

The bonding agent 90 preferably has a melting point below 1832° F. (1000° C.) and preferably below 842° F. (450° C.). Because bonding agent 90 operates at about half the temperature used in existing capacitance sensor designs, the agent 90 reduces issues with oxidation, thereby reducing the overall manufacturing time and cost. Bonding agent 90 may also have a melting point in a range of prior art bonding agents (e.g. 1652 to 1832° F. (900 to 1000° C.)). The melting point of the bonding agent and the housing determines the maximum operating condition of the developed sensor. For example, using Inconel 718 along with a glass whose melting point is up to 1832° F. (1000° C.) allows the usage of the sensor to temperatures of up to 1472° F. (800° C.).

In an assembled and bonded state, the capacitor sensor 10 has an area "$A_1$" (see Eq. 2) which is now the surface area of the stator-encircled portion 71 of the outer sidewall surface 77 of the diaphragm 60, that is, $2\pi r_d(h_d-h_u)$, where "$r_d$" is the outer radius of the diaphragm 60, "$h_d$" is the height of the column portion 67 of the diaphragm 60, and "$h_u$" is the height of an un-encircled portion 69 of the column 63 (see FIGS. 9 & 10). The un-encircled portion 69 is that sidewall portion of the diaphragm 60 which is not encircled by the sidewalls 45 of the stator 40. Note that bonding agent 90 also helps control the vertical position of stator 40 relative to diaphragm 60 and, therefore the width of the gap "$g_2$" (see Eq. 2 and FIG. 11). This helps ensure that "$h_u$" is sufficient to prevent the lower end 59 of stator 40 from arcing or shorting against the base portion 65 of diaphragm 60. Preferably, the height "$h_d$" of the column portion 67 of the diaphragm 60 is in a range of 1.5 to 3 times the diameter "$d_d$" of the column portion 67.

Prior art designs, in which the stator is arranged above the diaphragm and does not encircle the diaphragm, have, an area "A" equal to $\pi(r_d^2-r_w^2)$, where $r_d$ is the radius of the diaphragm 60 and "$r_w$" is the radius of opening 55 in stator 40. A capacitance sensor 10 made according to this invention increases the area "A" and permits the sensor 10 to have a smaller diameter than prior art capacitance sensors while capable of providing sensing in the range of prior art sensors as well as sensing in an increased capacitance range (e.g., above 40 pF and up to about 200 pF). In one preferred embodiment, capacitance sensor 10 can detect capacitance of about 120 pF. The diameter of the protective housing 20 can be 2 in. (5.08 cm) or less, and is preferably in a range of about 0.75 to 1.25 in. (1.905 to 3.175 cm). Diameters of less than 0.75 in. (1.905 cm) can also be accomplished by extending the height of the diaphragm 60.

The sidewalls 75 of the column portion 67 of the diaphragm 60 have a thickness "$t_s$", but the upper end 79 of the diaphragm 60 has a wall thickness "$t_t$". The thickness "$t_t$" is sized so that the upper end 79 does not flex or bend in response to variations in pressure. Note that if the upper end 79 bends or deforms, then the bonding agent 90 may not return to its original shape, thereby potentially causing repeatability issues. The thickness "$t_s$" is sized so that the sidewalls 75 flex or bend in response to variations in pressure, thereby permitting the sidewalls 75 to move toward or away from) the inner sidewall surface 47 of the stator 40 and reduce the width "$g_1$" of the circumferential gap 87. By varying the wall thickness "$t_s$", sensor 10 can be used for high pressures (e.g., up to 30,000 psi (206.8 Mpa)).

Figures 12, 13:
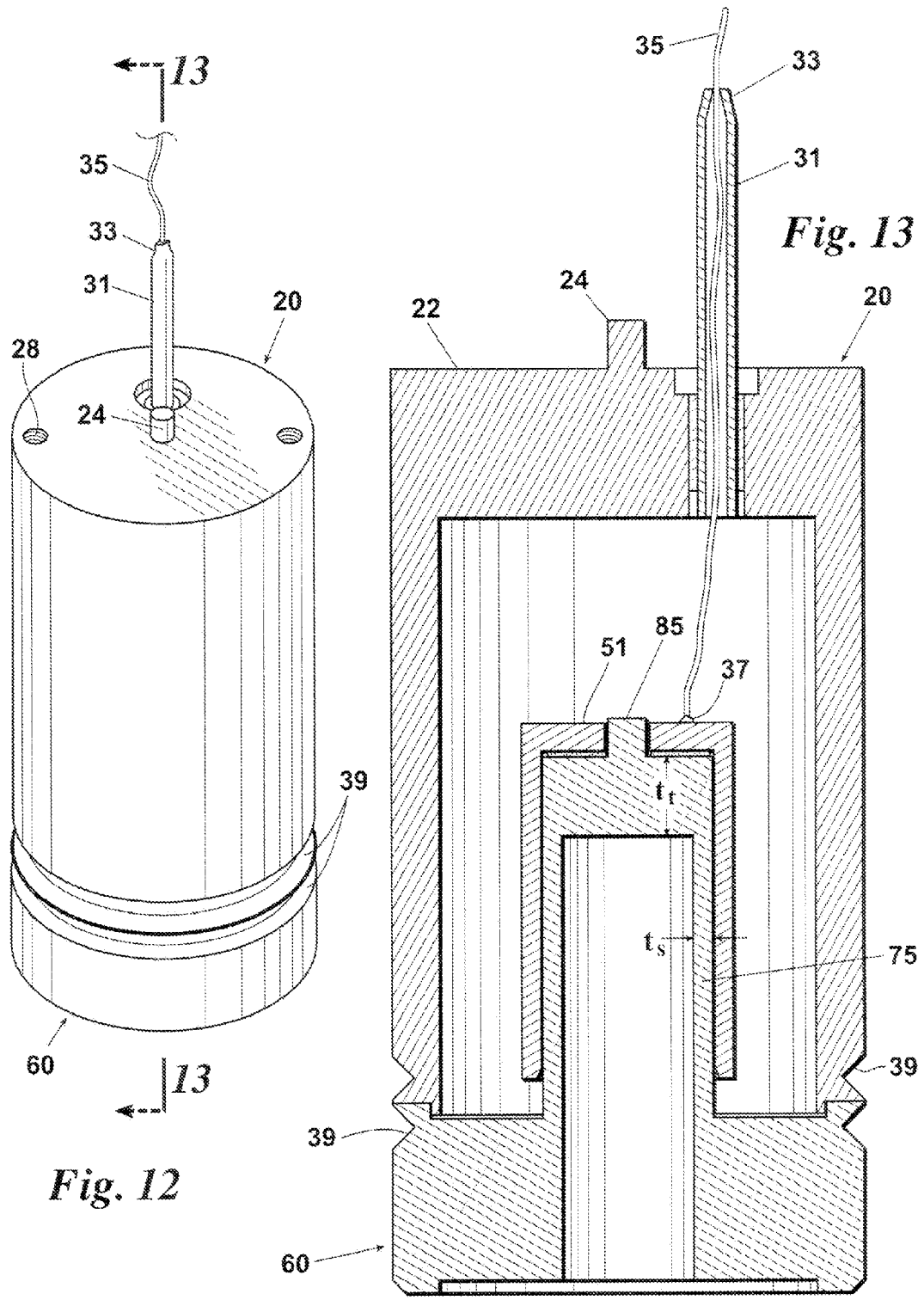
FIG. 12 is an isometric view of the assembled capacitance sensor of FIG. 1.
FIG. 13 is a cross-section view taken along section line 13-13 of FIG. 12. A conductive wire passes through an evacuation tube and is welded to the upper planar surface of the stator.

Referring to FIGS. 1, 2 & 13, an evacuation tube bonding agent 29 and an evacuation tube 31 are placed in the respective positions. The lower end 37 of the conductive wire 35 is welded on the upper planar surface 51 of stator 40 and conductive wire 35 is brought out through the evacuation tube 31. The bonding agent 29 ensures that the evacuation tube 31, which is conductive, is electrically insulated from the protective (metal) housing 20. The protective housing 20 is welded to diaphragm 60 as previously described. Bonding agent 29 is cured at the required temperature in order to form a seal, which could be the same temperature as that of bonding agent 90 or a different temperature. The complete assembly is evacuated and backfilled with the required dielectric medium (e.g., Argon, Helium, or a mixture of both) and the upper end 33 of the evacuation tube 31 is crimped and welded. The evacuation tube 31 and the protective housing 20 forms the two leads required for the electronic circuits to convert capacitance into frequency.

When in the assembled state, capacitance sensor 10 includes an oscillator board and other electronics (not shown) of a type known in the art and located above the upper planar surface 22 of protective housing 20. The oscillator board (not shown) contains an inductor and is used to convert capacitance into frequency, which is achieved using Equation 3 as shown below:

$$f = \frac{1}{2*\Pi*\sqrt{L*C}} \quad \text{(Eq. 3)}$$

Where "f" is the frequency, "L" is the inductance, "C" is the capacitance of the sensor, and "π" takes the value of 3.14. The advantage of using such a device is its capability to amplify small capacitance changes into large frequency changes. The oscillator board includes two thru-hole openings, one for receiving stub 24 (and providing a ground), the other for receiving evacuation tube 31. The oscillator board is in communication with means for receiving and processing the frequency signal which results from the measured capacitance "C". Tapped holes 28 (see FIG. 8) receive threaded screws (not shown) to attach other electronic components (not shown and which are used to transmit the generated frequency to the surface for further processing) and subsequent housing for those components to the sensor 10.

A person of ordinary skill the art would recognize that the preferred embodiments described above are not all possible embodiments of a capacitance sensor made according to this invention, and that changes could be made in its design and construction without departing from the scope of the following claims.

What is claimed is:

1. A capacitive pressure sensor comprising:
   a protective housing;
   a stator; and
   a diaphragm;
   the protective housing, the stator, and the diaphragm each being cylindrical-shaped with a hollow interior space and an open bottom end;
   the stator encircling a portion of the diaphragm and forming a circumferential gap between an inner sidewall surface of the stator and an outer sidewall surface of the encircled portion of the diaphragm.

2. A capacitive pressure sensor according to claim 1 wherein a width of the circumferential gap is in a range of 0.003 to 0.01 in. (0.00762 to 0.0254 cm).

3. A capacitive pressure sensor according to claim 1 wherein a capacitance "C" of up to 200 pF is detected.

4. A capacitive pressure sensor according to claim 1 further comprising the protective housing, the stator, and the diaphragm each having a height and a diameter, the height being greater than the diameter.

5. A capacitive pressure sensor according to claim 4 wherein the protective housing diameter is no greater than 2 in. (5.08 cm).

6. A capacitive pressure sensor according to claim 1 wherein a diameter of a column portion of the diaphragm is less than a height of the column portion of the diaphragm, wherein the height of the column portion of the diaphragm is in a range of 1.5 times and 3 times the diameter of the column portion of the diaphragm.

7. A capacitive pressure sensor according to claim 1 further comprising a bonding agent located at an upper end of the diaphragm and between a lower planar surface of the stator and an upper planar surface of the diaphragm.

8. A capacitive pressure sensor according to claim 7 further comprising the bonding agent bonding said planar surfaces one to the other.

9. A capacitive pressure sensor according to claim 7 further comprising the bonding agent having a melting point no greater than 1832° F. (1000° C.).

10. A capacitive pressure sensor according to claim 7 wherein a melting temperature of the bonding agent is below that of a melting temperature of the stator and the diaphragm.

11. A capacitive pressure sensor according to claim 7 further comprising the bonding agent being a glass washer.

12. A capacitive pressure sensor according to claim 7 further comprising the bonding agent being a means for controlling a vertical alignment of the stator relative to the diaphragm.

13. A capacitive pressure sensor according to claim 1 further comprising the diaphragm having a stub located at its upper end, the stub receiving a bonding agent.

14. A capacitive pressure sensor according to claim 1 further comprising a centering sleeve, the centering sleeve placing an inner sidewall surface of the stator in a predetermined gap relationship to an outer sidewall surface the diaphragm.

15. A capacitive pressure sensor according to claim 1 further comprising a wall thickness at an upper end of the diaphragm being greater than a wall thickness of a sidewall of the diaphragm.

16. A capacitive pressure sensor according to claim 15 further comprising the upper end wall thickness and side wall thickness being selected such that at a desired pressure the side of the diaphragm bends and the upper end does not bend.

17. A capacitive pressure sensor according to claim 15 further comprising the side wall thickness being selected to allow the capacitive pressure sensor to accommodate a pressure up to 30,000 psi. (206.8 Mpa).

18. A capacitive pressure sensor according to claim 1 further comprising an interior space of the protective housing being in a sealed state and containing a dielectric medium when the capacitive pressure sensor is in an assembled state.

19. A capacitive pressure sensor according to claim 1 wherein the protective housing, the stator, and the diaphragm are each made of thermally and electrically conductive material.

20. A capacitive pressure sensor according to claim 1 wherein a temperature limitation of the capacitive pressure sensor when in use is determined by a glass transition temperature of a bonding agent, the bonding agent being located between the stator and the diaphragm.

* * * * *